UNITED STATES PATENT OFFICE.

ALBRECHT SCHMIDT, OF HÖCHST-ON-THE-MAIN, GERMANY, ASSIGNOR TO FARB-WERKE VORM. MEISTER LUCIUS & BRÜNING, OF HÖCHST-ON-THE-MAIN, GERMANY, A CORPORATION OF GERMANY.

SYNTHETIC INDIGO IN A NEW FORM AND PROCESS OF MAKING SAME.

1,058,019.     Specification of Letters Patent.     Patented Apr. 1, 1913.

No Drawing.     Application filed August 11, 1910. Serial No. 576,703.

*To all whom it may concern:*

Be it known that I, ALBRECHT SCHMIDT, Ph. D., chemist, a citizen of the Empire of Germany, residing at Höchst-on-the-Main, Germany, have invented certain new and useful Improvements in Synthetic Indigo in a New Form and Processes of Making Same, of which the following is a specification.

I have found that by allowing indigo to form from derivatives of indol which are closely related to indigo and capable of directly yielding indigo, in presence of aminosulfonic acids containing residues derived from the benzyl group $C_6H_5CH_2$, such indigo separates in a new hitherto unknown form. The formation of this new indigo may be effected, for instance, by dissociating with water indigo salts in presence of the above-mentioned benzylated acids or their salts, whereby the new indigo is liberated; or by precipitating with air or another oxidizing agent solutions or pastes consisting of indigo leuco salts (indoxyl-alkali, salts of indigo-white, etc.) These sulfonic acids of amin-bases, wherein at least one hydrogen atom of the amin is replaced by a benzyl residue, correspond to the type:

$$\left[ N \underset{r_3}{\overset{R}{\underset{r_2}{\overset{B}{\underset{r_1}{<}}}}} (SO_3 \cdot A)_x \right]$$

wherein $SO_3$ means sulfo residues; A=hydrogen, metal, ammonium ($NH_4$); $x$=a number not over 6; R=aryl, alkyl or the residues derived therefrom; N=nitrogen; B=residues containing benzyl, halogenbenzyl, nitrobenzyl or sulfobenzyl; $r_1$=hydrogen, alkyl, aryl, residues of benzyl, halogenbenzyl, nitrobenzyl or sulfobenzyl; $r_2$=alkyl; $r_3$=a halogen, residues of sulfuric acid, alkylsulfuric acid, arylsulfuric acid; and wherein $r_2$ and $r_3$ may be omitted altogether.

The following acids may, for instance, be mentioned: benzylsulfanilic acids (ortho-meta-para), benzylanilinsulfonic acid, benzylanilindisulfonic acids, dibenzylanilin-mono (or di-) sulfonic acid, sulfobenzylsulfanilic acids, benzylnaphthylamin sulfonic acids, benzylamidonaphtholsulfonic acids, for instance 2.5.7-chlorobenzylsulfanilic acids, benzyldimethylphenyl-ammonium-chlorid-mono (and di) sulfonic acids, for instance

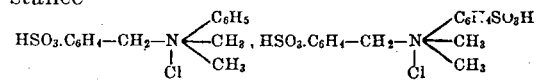

etc., benzylchloranilinsulfonic acids, benzyltoluidinsulfonic acids, benzylylidin-sulfonic acids, etc.

The following examples will illustrate the process but are not intended to limit it to these operating methods.

Example 1: 200 parts by weight of indigo are introduced into 2000 parts of sulfuric acid of 60° Bé., in which about 50 parts of benzylsulfanilic acid or benzylsulfanilate of sodium are dissolved. After stirring for some time, the mass is gradually poured on ice. The operation may also be reversed, viz. in such a manner that the mixture, consisting of indigosulfate, benzylsulfanilic acid and sulfuric acid, is well cooled and diluted sulfuric acid or ice very gradually added to it, either of these agents effecting the decomposition of the indigo-sulfate into indigo without occasioning any considerable rise of temperature. The decomposition of the above described mixture of benzylsulfanilic acid, indigosulfate and sulfuric acid may also be effected in water in presence of other bodies, for instance some starch or other insoluble or soluble carbohydrates or similar bodies, such as glycerin, also in presence of voluminous bodies such as kaolin, hydrate of silicic acid, these various bodies better retaining the colloid-like form of the indigo, in which it can be easily made into a paste, and preventing it from changing into a form in which it can only with difficulty be moistened and made into a paste with water, and is therefore more difficultly reducible. The finely divided acid dyestuff-paste thus obtained is passed through the press and washed until the sulfuric acid is removed from the press-cake; the latter may then be washed with a neutralizing agent, or there may be added to it caustic soda lye, ammonia or a similar neutralizing agent, until the mass shows a neutral reaction, or becomes slightly alkaline. The product thus prepared possesses the property of being extremely easily reduced even by reducing agents of very weak action, a property which is of very great technical importance; thus the product is reduced in the cold glucose-vat (fermentation-vat) much quicker and much more readily than any other known synthetic indigo.

The indigo thus produced is a new physical form of synthetic indigo and is entirely different from the hitherto known indigoes. For instance, it is distinguished from the indigo described and claimed in U. S. Patent No. 671,344 and produced from indigo-sulfate by the following characteristic properties: On diluting the paste or the dried-up and again remade paste with a large quantity of water, a deep blue liquid of pigment-like coloration is obtained in which the indigo appears almost dissolved, a property which the indigo produced according to U. S. Patent 671,344 does not possess. By spreading the paste, previously highly diluted with water, over a plate, a homogenous transparent liquid layer of a bluish color is obtained, whereas the indigo produced according to U. S. Patent No. 671,344 yields a layer obviously composed of separate solid particles. Even when this layer is placed under the microscope with a very great (for instance 1250 fold) magnification, with which tubercle bacilli are easily perceptible, no crystals can be discovered in it, but only a milky emulsion consisting of minute, scarcely visible structures of the appearance of little drops; whereas the paste produced according to U. S. Patent No. 671,344 easily shows coarse crystals. If the paste of the new indigo, after being well diluted with water, is filtered through filter-paper, a deep-blue liquid is obtained, which is not the use with the indigo prepared according to U. S. Patent No. 671,344. Moreover, the pastes of the new indigo when well diluted with water remain in suspension for a very long time as a blue liquid, whereas the indigo produced according to U. S. P. No. 671,344 quickly settles at the bottom. The new indigo is extremely readily and quickly reduced by reducing agents of weak action, for instance in the cold glucose-vat (fermentation-vat), possessing this property in incomparably greater degree than the indigo produced according to U. S. Patent No. 671,344. This ready reducibility by weak reagents is a distinguishing and very important technical characteristic of the new product. The new indigo is also distinguished from the indigo coloring-matter produced according to U. S. Patent No. 820869 by passing air through an indigo leuco compound in presence of a fatty acid, by its very extraordinary quick reducibleness; furthermore the new indigo possesses the following distinguishing properties: Its paste, when slightly acidulated with highly diluted acetic acid, alters only very little as regards its physical condition and deposits only after a longer time, whereas the paste obtained according to U. S. Patent No. 820,869 becomes thick upon the addition of acetic acid and deposits water immediately.

Example 2: One kg. of a fusion of indigo of 20% strength, or the corresponding quantity of alkali salt of indoxyl or an indigo vat, is diluted with about 1–5 kg. of water while adding 50 gr. (or more or less as the case may be) of the salts of the benzylsulfanilic acid or of an acid of the above mentioned type, and the solution is precipitated, while stirring, by air or another oxidizing agent. In this manner the above-described new indigo is obtained as a pigment-like product which can still be filtered, though with some difficulty.

The new hereinbefore described indigo can be made up into a paste- or powder- or lump-form; it substantially retains its properties when dry; thus the above described press-cake may be allowed to dry up into lumps by exposing it to the air or to heat; furthermore the water may be caused to evaporate in vacuo or at a raised temperature, whereby a powder or small lumps are obtained; or the powder, which may be in a still moist or in dry condition, can be pressed so as to form shaped lumps. Finally there may be added for the respective purposes suitable inorganic or organic substances, such as china-clay, kaolin, glycerin, sugar-like substances, starch, etc.

By the term "derivatives of indol which are closely related to indigo and capable of directly yielding indigo", I primarily mean the indigo salts, both those of the dyestuff itself and of its leuco compounds.

The new product in the dry form, specifically a powder, is claimed in my application Ser. No. 708,481, filed July 9, 1912. The new product in the form of lumps, and mixed with solid diluents, is claimed in my application Ser. No. 577,200, filed August 15, 1910.

Having now described by invention, what I claim is:

1. As a new product, the hereinbefore-described new physical form of synthetic indigo, characterized by being easily reduced by slightly alkaline reducing agents, and by yielding, when made up into a paste with water, a deep-blue difficultly-depositing liquid paste, which, on being put on a filter, gives a blue filtrate, in which, when seen through the microscope, no more crystalline indigo-particles can be discerned.

2. The process of preparing the herein-described new indigo, which consists in producing the indigo from derivatives of indol which are nearly related to indigo and capable of directly yielding indigo, in presence of a sulfonic acid of an organic amin wherein at least one hydrogen atom of the amin is replaced by a benzyl residue.

3. The process of preparing the herein-described new indigo, which consists in producing the indigo from indigo salts in presence of a sulfonic acid of an organic amin wherein at least one hydrogen atom of the amin is replaced by a benzyl residue.

4. The process of preparing the herein-described new indigo, which consists in producing the indigo from leuco-indigo salts in presence of a sulfonic acid of an organic amin wherein at least one hydrogen atom of the amin is replaced by a benzyl residue.

In testimony whereof, I affix my signature in presence of two witnesses.

ALBRECHT SCHMIDT.

Witnesses:
  JEAN GRUND,
  CARL GRUND.